United States Patent [19]

Norkey

[11] Patent Number: 4,819,908
[45] Date of Patent: Apr. 11, 1989

[54] QUICK CONNECT FLUID COUPLING

[75] Inventor: Phillip J. Norkey, Jackson, Mich.

[73] Assignee: Edwards Industries, Inc., Royal Oak, Mich.

[21] Appl. No.: 180,307

[22] Filed: Apr. 12, 1988

[51] Int. Cl.[4] .................................................. F16L 37/28
[52] U.S. Cl. ..................................... 251/149.6; 251/356
[58] Field of Search ............................ 251/149.6, 356

[56] References Cited

U.S. PATENT DOCUMENTS

| | | | |
|---|---|---|---|
| 2,327,611 | 8/1943 | Scheiwer | 251/149.6 |
| 2,412,685 | 12/1946 | Hoffman et al. | 251/149.6 |
| 3,177,018 | 4/1965 | Goodwin | 251/149.6 |
| 3,567,175 | 3/1971 | Sciuto, Jr. | 251/149.6 |
| 3,873,062 | 3/1975 | Johnson et al. | 251/149.6 |
| 4,576,359 | 3/1986 | Oetiker | 251/149.6 |

Primary Examiner—A. Michael Chambers
Attorney, Agent, or Firm—Gifford, Groh, Sheridan, Sprinkle and Dolgorukov

[57] ABSTRACT

A quick connect fluid coupling having a female part and a male part which is insertable into the female part to thereby establish the fluid connection between the coupling parts. A metal spring retainer in the female part engages an outwardly extending flange on the male part upon insertion into the female part to lock the coupling parts together. In addition, a shut off valve member is contained within the female part and is movable between a closed position and an open position. In the closed position, a seal ring in the female part sealingly engages a central cylindrical portion of the valve member and blocks fluid flow through the female part. Conversely, upon insertion of the male part into the female part, the male part moves the valve member to its open position and enables fluid flow through the fluid coupling parts. Simultaneously, the seal ring engages the outer periphery of the male part and fluidly seals the male and female parts together.

10 Claims, 2 Drawing Sheets

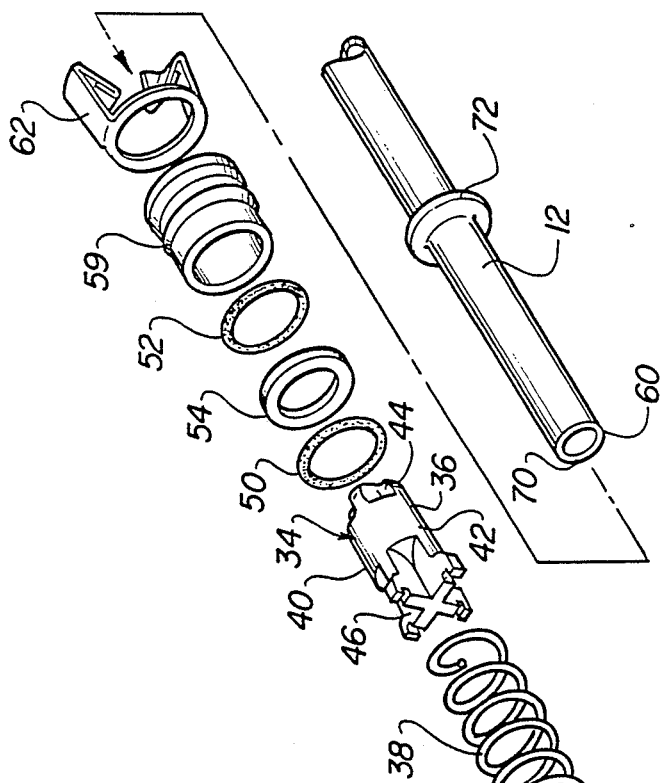
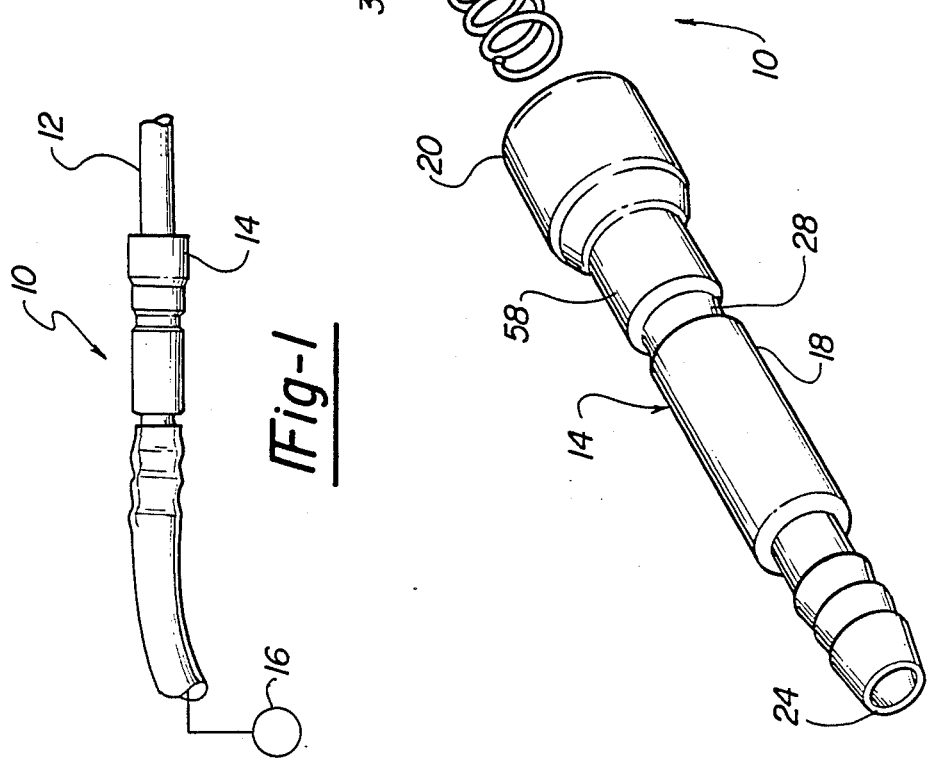

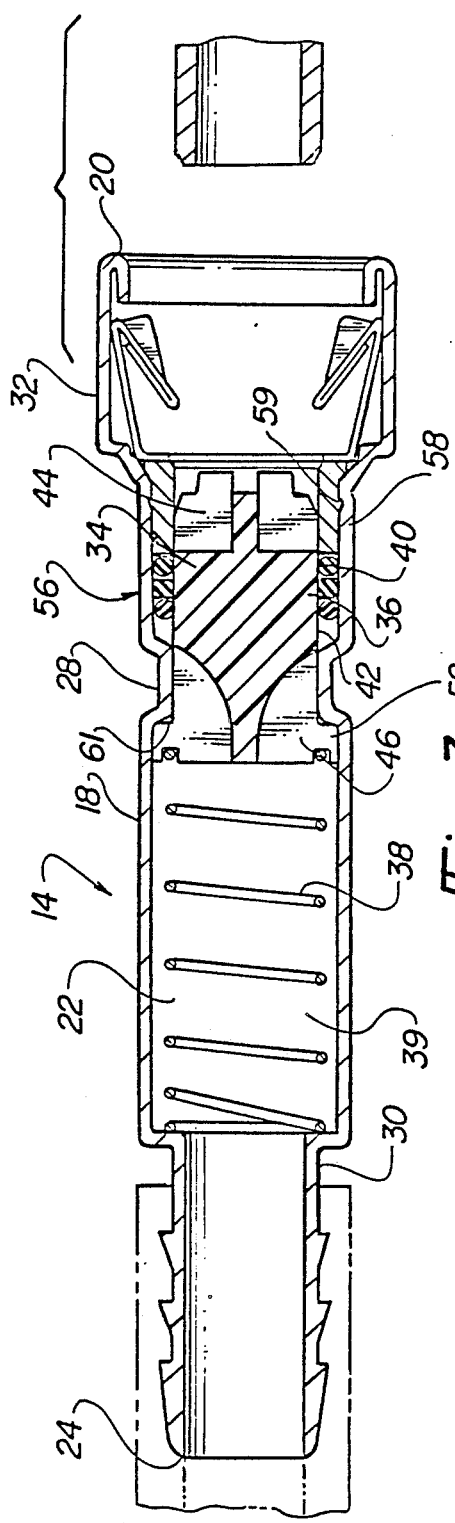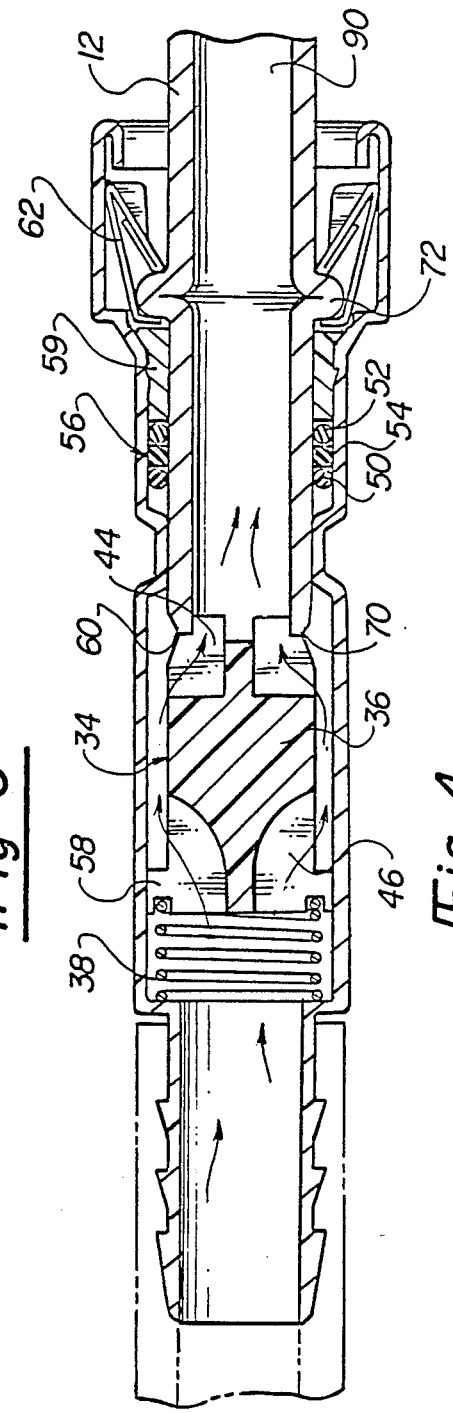

QUICK CONNECT FLUID COUPLING

BACKGROUND OF THE INVENTION

I. Field of the Invention

The present invention relates generally to fluid couplings and, more particularly, to a quick connect fluid coupling.

II. Description of the Prior Art

There are many previously known quick connect fluid couplings which typically comprise a male part and a female part. The male part is manually insertable into the female part in order to establish the fluid connection between the male and female parts. Upon insertion, a locking mechanism in the female part and/or male part locks the coupling parts together while a seal assembly simultaneously fluidly seals the coupling parts together.

A number of the previously known quick connect fluid couplings also include a one way shut off valve in the female part of the coupling. Such couplings retain fluid in the fluid system associated with the female part of the coupling until the female and male parts are connected together. Upon connection, the valve is moved to its open position and enables fluid flow through the fluid system. Such fluid couplings are used, for example, in automotive air conditioning systems where the portion of the fluid system associated with the female part of the coupling is charged or pressurized with freon.

These previously known quick connect fluid couplings with shut off valves all suffer from a number of disadvantages. One such disadvantage is that the fluid seal arrangement used to fluidly seal the shut off valve to the female part when the valve is in its closed position is separate from the fluid seal arrangement used to fluidly seal the male and female parts together upon connection. This increases both the cost and complexity of the fluid coupling.

A still further disadvantage of the previously known quick connect fluid couplings with shut off valves is that these couplings typically used a compression spring to urge the shut off valve against a resilient seal in order to fluidly seal the shut off valve to the female coupling part. Consequently, the force of the spring controls the integrity of the fluid seal. This previously known arrangement, however, oftentimes failed to achieve an effective fluid seal so that leakage from the fluid system resulted. This is particularly true where the spring is defective or weakened after protracted use or non-use from a defective design.

SUMMARY OF THE PRESENT INVENTION

The present invention provides a quick connect fluid coupling with a shut off valve which overcomes all of the above mentioned disadvantages of the previously known devices.

In brief, the fluid coupling of the present invention comprises a female part having an open end and defining a fluid passageway. A male part is insertable into the open end of the female part in order to establish fluid connection between the coupling parts. Furthermore, upon insertion, a resilient retainer in the female part engages an outwardly extending flange on the male part to lock the coupling parts together.

An elongated valve member is axially slidably mounted in the female part and is movable between a closed position and an open position. In its closed position, a central cylindrical portion of the valve member radially compresses a resilient seal between the valve member and the female part and blocks fluid flow through the female part. A compression spring urges the valve member towards its closed position and the fluid pressure maintains the valve member in its closed position.

Upon insertion of the male part into the female part, the male part engages the valve member and moves the valve member to its open position. In its open position the valve member permits fluid flow through the fluid coupling. Furthermore, upon insertion of the male part into the female part, the resilient seal radially compresses between the outer periphery of the male part and the female part to fluidly seal the coupling parts together.

A primary advantage of the fluid coupling of the present invention is that a single seal assembly fluidly seals both the valve member and the male part to the female part of the coupling. This reduces both the complexity and cost of the fluid coupling.

A still further advantage of the fluid coupling of the present invention is that the radial compression of the seal assembly between the valve member and the female coupling part establishes the integrity of the fluid seal between the valve member and the female coupling part rather than the force of the compression spring. Thus, unlike the previously known fluid couplings, fluid leakage from the fluid system is prevented.

Still further advantages will become apparent to those skilled in the art upon reading the patent specification.

BRIEF DESCRIPTION OF THE DRAWING

A better understanding of the present invention will become apparent to those skilled in the art to which it pertains upon reference to the following detailed description when read in conjunction with the accompanying drawing, wherein like reference characters refer to like parts throughout the several views, and in which:

FIG. 1 is a side view of a preferred embodiment of the present invention;

FIG. 2 is an exploded view of the preferred embodiment of the present invention;

FIG. 3 is a longitudinal sectional view of the preferred embodiment of the present invention and showing the coupling in an unconnected condition with the shut off valve in the closed position; and FIG. 4 is a view similar to FIG. 3 but illustrating the fluid coupling in a connected condition with the shut off valve in the open position.

DETAILED DESCRIPTION OF A PREFERRED EMBODIMENT OF THE PRESENT INVENTION

With reference first to FIGS. 1 and 2, a preferred embodiment of the fluid coupling 10 of the present invention is thereshown and comprises a male part 12 and a female part 14. The female part 14 is fluidly connected to a fluid system 16, such as the fuel system of an automotive vehicle. The system 16 may be pressurized with a fluid.

With reference now to FIGS. 2 and 3, the female part 14 is thereshown in greater detail and comprises an elongated housing 18 having an open end 20. The housing 18 is tubular, thus defining a fluid passageway 22 which extends from the open end 20 of the housing 18 to its other end 24. The housing 18, furthermore, is generally cylindrical in crossectional shape and has a reduced diameter central portion 28 and a second reduced diameter portion 30 adjacent its other end 24. An enlarged diameter portion 32 of the housing 18 is formed adjacent its open end 20.

Referring now to FIGS. 2-4, a valve member 34 is contained within the fluid passageway 22 of the female coupling part 14. The valve member 34 has an elongated body 36 and is movable between a closed position, shown in FIG. 3, and an open position, shown in FIG. 4. A helical compression spring 38 is contained within a chamber 39 formed in the housing 18 between its reduced diameter portions 28 and 30 and this spring 38 urges the valve member 34 towards its closed position.

With reference now particularly to FIGS. 2 and 3, the valve member 34 has a central cylindrical portion 40 with a cylindrical outer periphery 42. Cut out portions 44 and 46 are formed on the valve member 34 on the outer and inner axial ends of the valve member 34, respectively. These cut out portions 44 and 46 form part of the flow path through the female part 14 when the valve member 34 is in its open position (FIG. 4).

A pair of resilient cylindrical seal members 50 and 52 having a cylindrical spacer 54 positioned between them form a seal assembly 56. This seal assembly 56 is contained within a section 58 of the female part housing 18 between the enlarged diameter portion 32 and the reduced diameter portion 28 of the housing 18. A bushing 59 holds the seal assembly 56 in place.

With reference now particularly to FIG. 3, the valve member 34 includes outwardly extending ribs 58 which abut against an annular abutment surface 61 formed by the intersection of the housing portions 28 and 39 of the female part 14. The abutment surface 61 thus forms a stop which retains the valve member 34 in the housing 18 of the female part 14.

The female housing 18 is dimensioned so that with the valve member 34 in its closed position, the seal elements 50 and 52 are radially compressed between the central cylindrical portion 40 of the valve member 34 and the section 58 of the housing 18. Thus, the valve member 34 blocks fluid flow through the female part 14 of the fluid coupling 10 when it is in its closed position. Furthermore, since the seal members 50 and 52 are radially compressed between the valve member 34 and the female part housing 18, the effectiveness or integrity of the fluid seal between the valve member 34 and the female housing 18 is independent of the force of the spring 38, assuming that the spring force together with any fluid pressure is sufficient to push the valve member 34 through the seal assembly 56.

Referring now to FIGS. 2 and 4, the male part 12 of the coupling 10 has an open end 60 which is insertable into the open end 20 of the female part 14 as shown in FIG. 4. A spring metal retainer 62 is entrapped within the enlarged diameter portion 32 of the female part housing 18. This retainer 62 locks the male part 12 to the female part 14 as discussed more fully below.

The male part 12 of the fluid coupling 10 is insertable to a connected position best shown in FIG. 4 of the patent drawing. Upon insertion of the male part 12, the free end 60 of the male part 12 moves the valve member 34 to its open position (FIG. 4). Simultaneously, the retainer 62 engages an enlarged diameter flange 72 on the male part 12 of the coupling 10 and locks the male and female parts together while permitting the coupling parts 12 and 14 to swivel with respect to each other. In addition, as best shown in FIG. 4, upon connection the male coupling part 12 extends through the reduced diameter portion 28 in the female housing 18.

The diameter of the male part 12 is substantially the same as the diameter of the cylindrical portion 40 of the valve member 34. Consequently, upon insertion of the male part 12 into the female part 14, the seal assembly 56 radially compresses and sealingly engages the outer periphery of the male part 12. In doing so, the seal assembly 56 fluidly seals the male and female parts 12 and 14 together.

As best shown in FIG. 4, the male coupling part 12 is tubular and cylindrical in shape and thus defines an interior fluid passageway 90. Upon connection of the male and female coupling parts 12 and 14, the fluid passageways 90 and 22 register with each other and establish a fluid connection through the coupling 10.

In practice, the spring 38 and valve member 34 are positioned within the housing 18 and the reduced diameter portion 28 of the housing 18 is then formed in the housing 18. The manufacturing step of forming the reduced diameter portion 28 thus secures the valve member 34 within the housing 18.

From the foregoing, it can be seen that the present invention provides a simple, inexpensive and yet totally effective quick connect coupling which overcomes all of the above mentioned disadvantages of the previously known devices. Having described my invention, however, many modifications thereto will become apparent to those skilled in the art to which it pertains without deviation from the spirit of the invention as it is defined in the appended claims.

I claim:

1. A quick connect fluid coupling comprising:
    a tubular cylindrical male part having a cylindrical outer periphery and an open end,
    a female part having an open end and defining a fluid passageway, said open end of said male part being insertable into said female part open end to a connected position whereupon said fluid passageways register with each other,
    a valve member contained within said female part fluid passageway, said valve member being movable between an open position and a closed position, wherein in said closed position said valve member blocks fluid flow through said female part fluid passageway and wherein in said open position said valve member enables fluid flow through said female part fluid passageway,
    means for urging said valve member towards said closed position,
    means on said male part for moving said valve member to said open position upon insertion of said male part into said female part to said connected position,
    means for locking said male part and said female part together in said connected position,
    said valve member comprising an elongated body having a central cylindrical portion,
    a fluid seal, and
    means for mounting said seal in said female part fluid passageway so that said fluid seal radially compresses and sealingly engages said valve member cylindrical portion when said valve member is in said closed position and so that said seal radially compresses and sealingly engages a central portion of said outer periphery of said male part when said male part is in said connected position, wherein said valve member comprises cut-out portions on each axial end of said cylindrical portion, said cut-out portions forming part of the fluid passageway through said female part when said valve member is in said open position and wherein said cut-outs are open to the outer periphery of said body of said valve member.

2. The invention as defined in claim 1 wherein said valve member comprises a plurality of outwardly extending ribs adjacent its end most spaced from the open end of said female part, and wherein said female part includes a reduced diameter portion, said ribs abutting against said reduced diameter portion when said valve member is in said closed position to thereby retain said valve member in said female part fluid passageway.

3. The invention as defined in claim 2 wherein with said male part inserted into said female part, said male part extends through said reduced diameter portion of said female part.

4. The invention as defined in claim 1 wherein said urging means comprises a helical compression spring.

5. The invention as defined in claim 2 wherein said mounting means comprises a bushing, said bushing being dimensioned so that said fluid seal is sandwiched between said bushing and said reduced diameter portion.

6. The invention as defined in claim 1 wherein said male part is cylindrical in shape and includes an outwardly extending flange, and wherein said locking means comprises a retainer which engages said flange when said male part is inserted to said connected position.

7. The invention as defined in claim 6 wherein said retainer is constructed of spring metal.

8. The invention as defined in claim 1 wherein said fluid seal comprises a pair of seal elements and a spacer sandwiched between said seal elements.

9. The invention as defined in claim 8 wherein each seal element is an O-ring.

10. The invention as defined in claim 1 wherein said male part is tubular and cylindrical in crosssectional shape and wherein the diameter of said portion of the outer periphery of said male part is substantially the same as the diameter of the central cylindrical portion of the valve member.

* * * * *